US010686647B1

(12) United States Patent
Kondapalli et al.

(10) Patent No.: US 10,686,647 B1
(45) Date of Patent: Jun. 16, 2020

(54) DESCRIPTOR ARCHITECTURE FOR A REMOTE NETWORK MANAGEMENT PLATFORM

(71) Applicant: ServiceNow, Inc., Santa Clara, CA (US)

(72) Inventors: Amarendra Kondapalli, Santa Clara, CA (US); Mark Bodman, Thorndale, TX (US); Shankar Kattamanchi, Hyderabad (IN); Venkata Ravikumar Moolaveesala, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/401,945

(22) Filed: May 2, 2019

(51) Int. Cl.
*G06F 15/173* (2006.01)
*H04L 12/24* (2006.01)

(52) U.S. Cl.
CPC ...... *H04L 41/0246* (2013.01); *H04L 41/0853* (2013.01); *H04L 41/0873* (2013.01); *H04L 41/0893* (2013.01)

(58) Field of Classification Search
CPC ............. H04L 41/0246; H04L 41/0853; H04L 41/0873; H04L 41/0893
See application file for complete search history.

(56) References Cited

U.S. PATENT DOCUMENTS

| | | | |
|---|---|---|---|
| 5,978,594 A | 11/1999 | Bonnell | |
| 6,199,059 B1 * | 3/2001 | Dahan | G06F 16/2423 |
| 6,321,229 B1 * | 11/2001 | Goldman | G06F 16/9027 |
| 6,816,898 B1 | 11/2004 | Scarpelli | |
| 6,895,586 B1 | 5/2005 | Brasher | |
| 7,027,411 B1 | 4/2006 | Pulsipher | |
| 7,392,300 B2 | 6/2008 | Anantharangachar | |
| 7,617,073 B2 | 11/2009 | Trinon | |
| 7,877,783 B1 | 1/2011 | Cline | |
| 7,945,860 B2 | 5/2011 | Vambenepe | |
| 8,554,750 B2 | 10/2013 | Rangaranjan | |
| 10,122,872 B1 * | 11/2018 | Shin | H04N 1/00344 |
| 2002/0035555 A1 * | 3/2002 | Wheeler | G06F 16/21 |
| 2004/0158575 A1 * | 8/2004 | Jacquemot | H04L 41/0659 |
| 2005/0149468 A1 * | 7/2005 | Abraham | H04L 41/12 |
| 2006/0085440 A1 * | 4/2006 | Jandhyala | G06F 16/10 |
| 2007/0276804 A1 * | 11/2007 | Khan | G06F 16/242 |

(Continued)

*Primary Examiner* — Jonathan A Bui
(74) *Attorney, Agent, or Firm* — Fletcher Yoder PC

(57) ABSTRACT

Systems and methods for mapping and managing interrelationships between data resources, application programs, and infrastructure components of a managed network are disclosed. A configuration management data database may contain configuration item (CI) records associated with CIs of the network. Each CI may correspond to configurable entities of the network, such as infrastructure components, application programs, and the data resources. A request relating to data resources of a data domain hierarchy of information object (IO) CIs may be received, where each IO CI is associated with a data resource of the network. A first look-up may identify one or more application programs that use the respective data resource associated with the given IO CI, and a second look-up may identify a resource database that stores the data resource associated with the given IO CI. A mapping list including the identities from the look-ups may be returned in response to the request.

20 Claims, 11 Drawing Sheets

(56) References Cited

U.S. PATENT DOCUMENTS

| | | | | |
|---|---|---|---|---|
| 2008/0147627 A1* | 6/2008 | Natkovich | ........... | G06F 16/2454 |
| 2009/0276404 A1* | 11/2009 | Henigman | ............... | G06F 16/00 |
| 2011/0131178 A1* | 6/2011 | Kanellos | ................. | G06F 16/83 |
| | | | | 707/609 |
| 2014/0122427 A1* | 5/2014 | Dary | ....................... | G06F 16/20 |
| | | | | 707/620 |
| 2015/0186447 A1* | 7/2015 | Milousheff | ........... | G06F 16/278 |
| | | | | 707/694 |

* cited by examiner

DESCRIPTOR ARCHITECTURE FOR A REMOTE NETWORK MANAGEMENT PLATFORM

BACKGROUND

Managed networks may include various types of computer networks that can be remotely administered. This management may involve one or more computing devices disposed within a remote network management platform collecting information about the configuration and operational states of software applications and hardware components executing on behalf on the managed network, and then presenting representations of this information by way of one or more user interfaces. The user interfaces may be, for instance, web-based user interfaces. In some instances, remote management of networks may be provided by a third party, such as a service provider or vendor.

A managed network itself may also support the mission and operations of an organization or enterprise. As such, network management and operations may involve tracking of information resources managed by the network in order to accommodate an organization's obligations for compliance, as well as enable planning and stewardship of the information resources. In this sense, information resources, or data resources, may be considered a form of assets—e.g. "data" assets—of an organization or enterprise, but can also be liabilities if not managed properly.

SUMMARY

An enterprise or organization may typically create, use, store, and manage various types of data and information. Such data and information may support various aspects of operations and/or be produced as part of various aspects of operations. Non-limiting examples may include user/customer data, account information, employee data, sales data, inventory data, and financial transaction data, to name a few. Data and information may be stored in one or more databases, and be accessed by one or more application programs, operations, or services, among other procedures and/or functional entities of an enterprise and/or its supporting network management. Thus, such data and information may be considered "data resources" of an enterprise, and even viewed as "data assets" or "information assets" of the enterprise or organization of or its supporting network management.

Periodically or from time to time, there can be circumstances, operations, and/or procedures within an enterprise that may require identification of all or a subset of particular data resources that meet some criteria, or that fall within one or more particular categories. The requirement may further extend to identification of all or some of the application programs that use the particular data resources, all or some of the resource databases that maintain the particular data resources, and all or some of the infrastructure elements or components that support the applications and resource databases. An example of such circumstance or operation may be an audit, which may need to be carried out for regulatory compliance reasons, or to fulfill some other operational need. The identification of the appropriate data resources, applications, databases, and infrastructure may be considered as defining or specifying the scope of the audit.

Conventionally, the sorts of interrelationships and mappings between data resources, applications, databases, and infrastructure that define or specify an audit scope are identified or determined by relatively ad hoc procedures. For example, manual analyses of data resources may be carried out to determine all particular data resources that meet some criteria. Then, a query may be sent to various network management personnel responsible for maintaining application programs, asking for a list of programs that use the particular data resources. A similar query may be sent asking database personnel to identify databases that maintain the particular data resources. The accuracy of conventional procedures may therefore be tied to the accuracy of the query responses. The inventors have recognized that the conventional approaches therefore may lack consistency and accuracy.

The inventors have further recognized that by treating data resources as configurable entities within a managed network, the sorts of interrelationships and mappings between data resources, applications, databases, and infrastructure that define or specify the scope of an audit or other operations may be transformed into a systematic, efficient, and accurate procedure. In particular, the inventors have recognized that data resources may be represented by a form of metadata, referred to as "information objects," that codifies interrelationships and mapping in a manner that allows automated discovery of specified categories of data resources, along with applications that use the data resources, databases that maintain the data resources, and infrastructure that supports the applications and databases. Information objects may also be used to capture and/or codify other forms of relationships that support other operations and functions besides audit and audit scope determination.

Accordingly, a first example embodiment may involve a system for mapping and managing interrelationships between data resources, application programs that utilize the data resources, and infrastructure components of a managed network associated with a computational instance of a remote network management platform, the system comprising: a configuration management data database (CMDB) disposed within the computational instance and configured for storing configuration item (CI) records associated with CIs of the managed network, wherein each CI corresponds to one of a class of entities that are configurable within the managed network, the class of entities including infrastructure components, application programs, and the data resources; and one or more server devices disposed within the computational instance, wherein the one or more server devices are configured to: receive, from a computing device, a request relating to one or more of the data resources associated with a particular data domain, wherein the particular data domain defines a particular hierarchy of information object (IO) CIs, each IO CI being a data structure associated with a respective data resource of the managed network, each respective data resource being stored in one or more resource databases of the managed network, and each resource database being implemented in one or more infrastructure components; for each given IO CI of the particular hierarchy, perform a first look-up in a pairing-relation table to identify each of one or more application programs that use the respective data resource associated with the given IO CI; for each given IO CI of the particular hierarchy, perform a second look-up in the pairing-relation table to identify a resource database of the one or more resource databases that store the respective data resource associated with the given IO CI; and transmit to the computing device a mapping list including identities of the data resources associated with the IO CIs of the particular hierarchy, the identified one or more applications programs, and each identified resource database.

In a second example embodiment may involve a method for mapping and managing interrelationships between data resources, application programs that utilize the data resources, and infrastructure components of a managed network associated with a computational instance of a remote network management platform, the computational instance comprising a configuration management data database (CMDB) configured for storing configuration item (CI) records associated with CIs of the managed network, wherein each CI corresponds to one of a class of entities that are configurable within the managed network, the class of entities including infrastructure components, application programs, and the data resources, and wherein the method is carried out by one or more servers of the computational instance and comprises: receiving, from a computing device, a request relating to one or more data resources associated with a particular data domain, wherein the particular data domain defines a particular hierarchy of information object (IO) CIs, each IO CI comprising a data structure associated with a respective data resource of the managed network, each respective data resource being stored in one or more resource databases of the managed network, and each resource database being implemented in one or more infrastructure components; for each given IO CI of the particular hierarchy, performing a first look-up in a pairing-relation table to identify each of one or more application programs that use the respective data resource associated with the given IO CI; for each given IO CI of the particular hierarchy, performing a second look-up in the pairing-relation table to identify a resource database of the one or more resource databases that store the respective data resource associated with the given IO CI; and transmitting to the computing device a mapping list including identities of the data resources associated with the IO CIs of the particular hierarchy, the identified one or more applications programs, and each identified resource database.

In a third example embodiment may involve a non-transitory computer readable medium having instructions stored thereon for mapping and managing interrelationships between data resources, application programs that utilize the data resources, and infrastructure components of a managed network associated with a computational instance of a remote network management platform, wherein the computational instance comprises (i) a configuration management data database (CMDB) configured for storing configuration item (CI) records associated with CIs of the managed network, wherein each CI corresponds to one of a class of entities that are configurable within the managed network, the class of entities including infrastructure components, application programs, and the data resources, and (ii) one or more servers, and wherein the instructions, when executed by one or more processors of the one or more servers, cause the one or more servers to carry out operations including: receiving, from a computing device, a request relating to one or more data resources associated with a particular data domain, wherein the particular data domain defines a particular hierarchy of information object (IO) CIs, each IO CI comprising a data structure associated with a respective data resource of the managed network, each respective data resource being stored in one or more resource databases of the managed network, and each resource database being implemented in one or more infrastructure components; for each given IO CI of the particular hierarchy, performing a first look-up in a pairing-relation table to identify each of one or more application programs that use the respective data resource associated with the given IO CI; for each given IO CI of the particular hierarchy, performing a second look-up in the pairing-relation table to identify a resource database of the one or more resource databases that store the respective data resource associated with the given IO CI; and transmitting to the computing device a mapping list including identities of the data resources associated with the IO CIs of the particular hierarchy, the identified one or more applications programs, and each identified resource database.

In a fourth example embodiment, a system may include various means for carrying out each of the operations of the second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
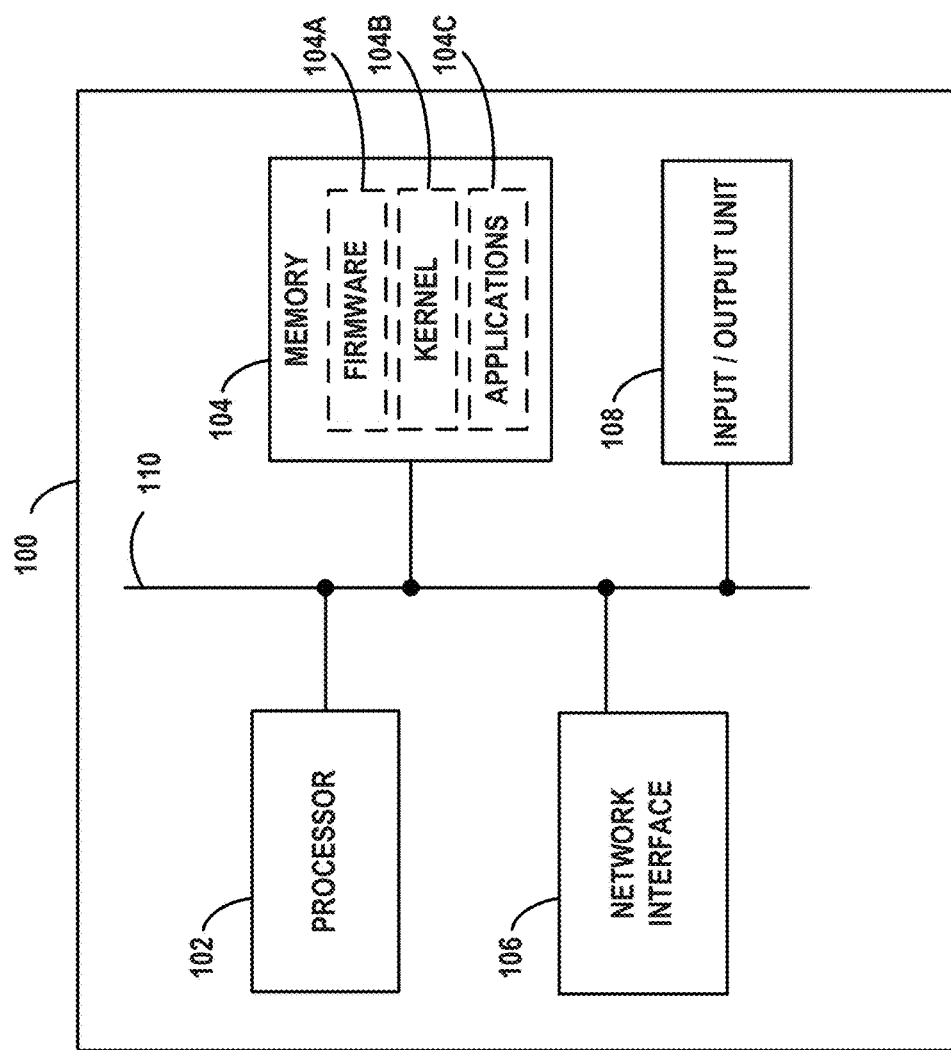
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
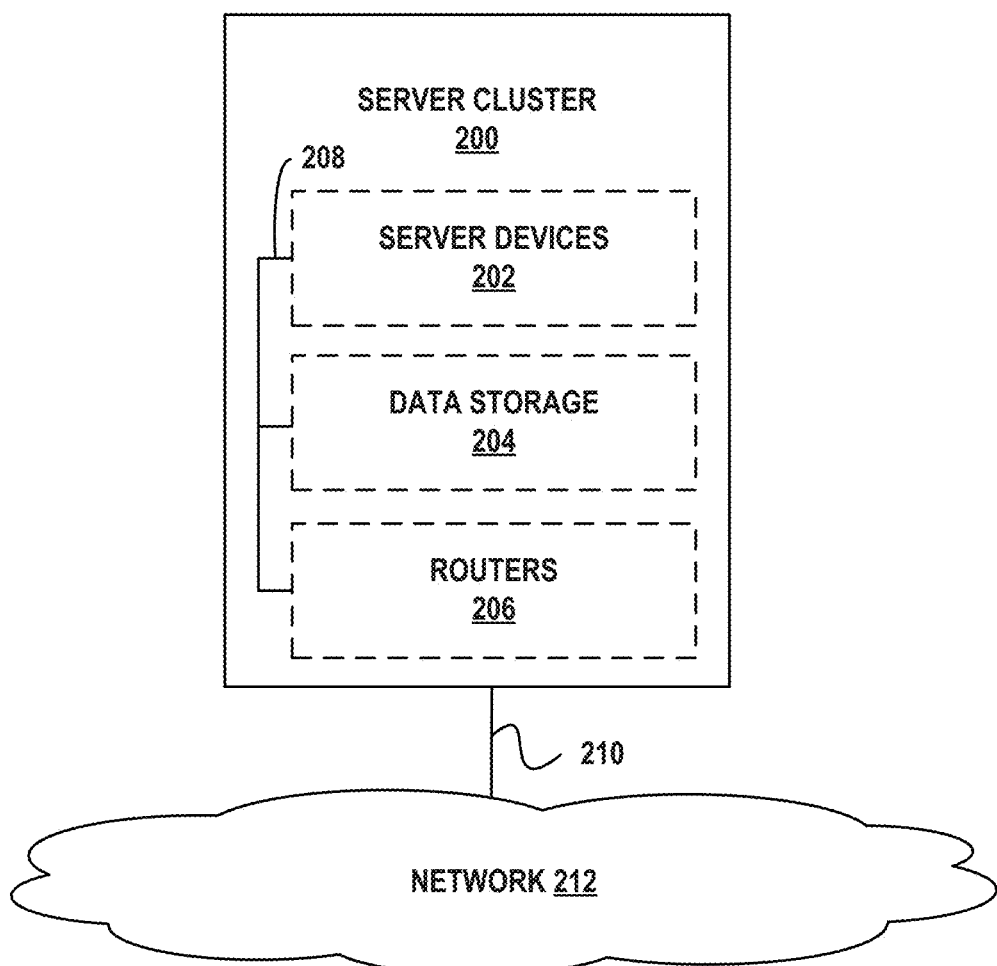
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives.

The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
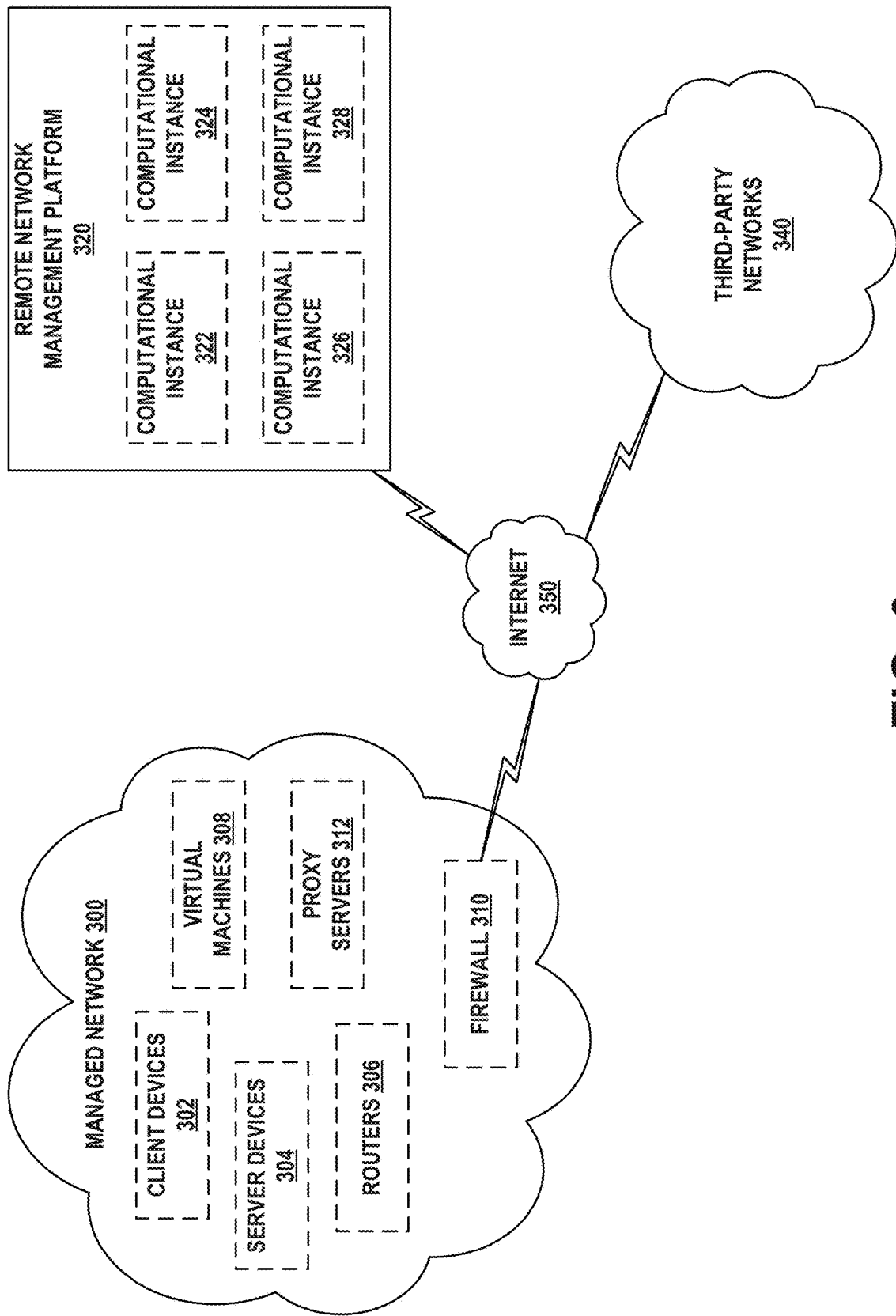
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
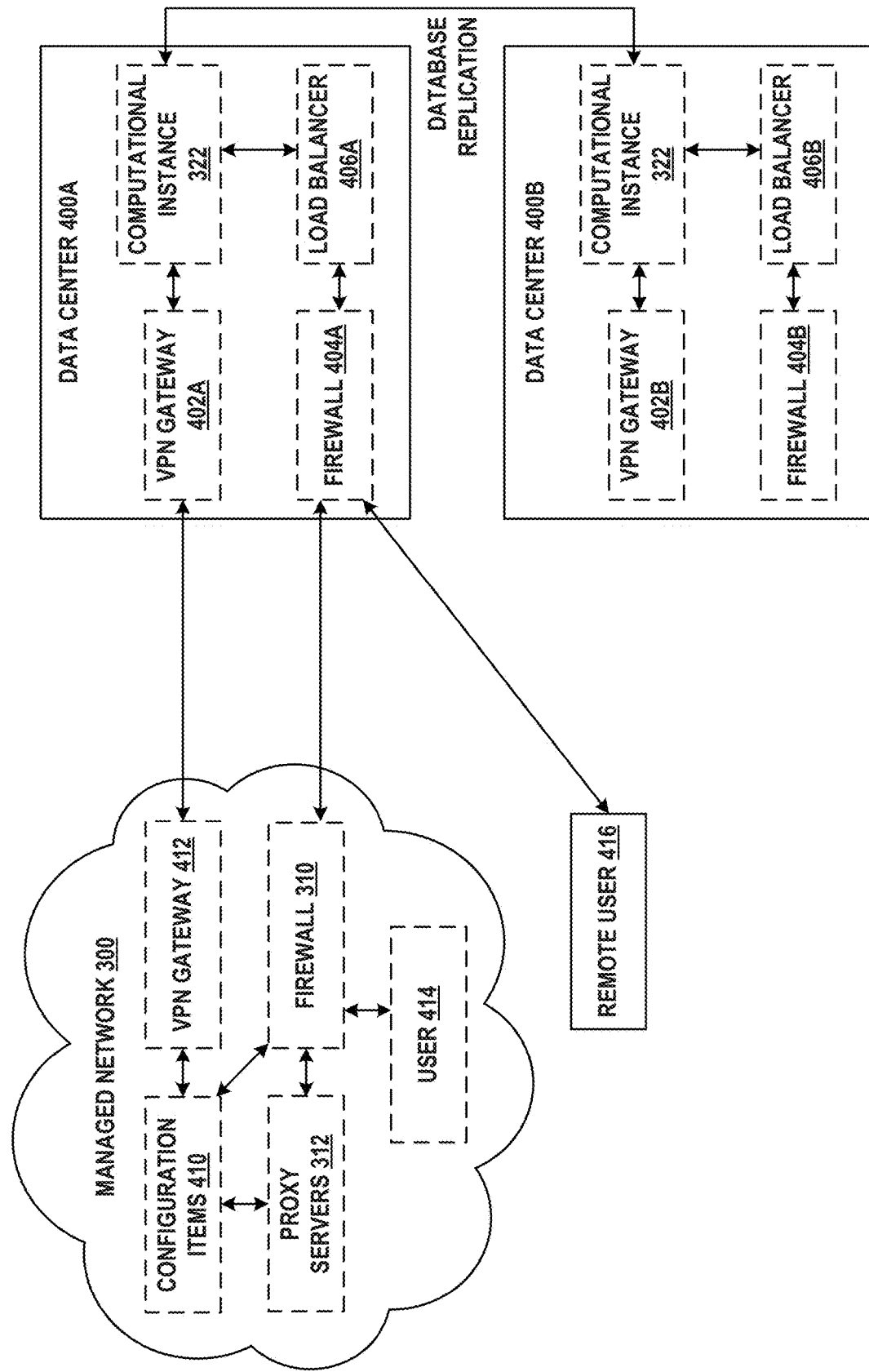
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
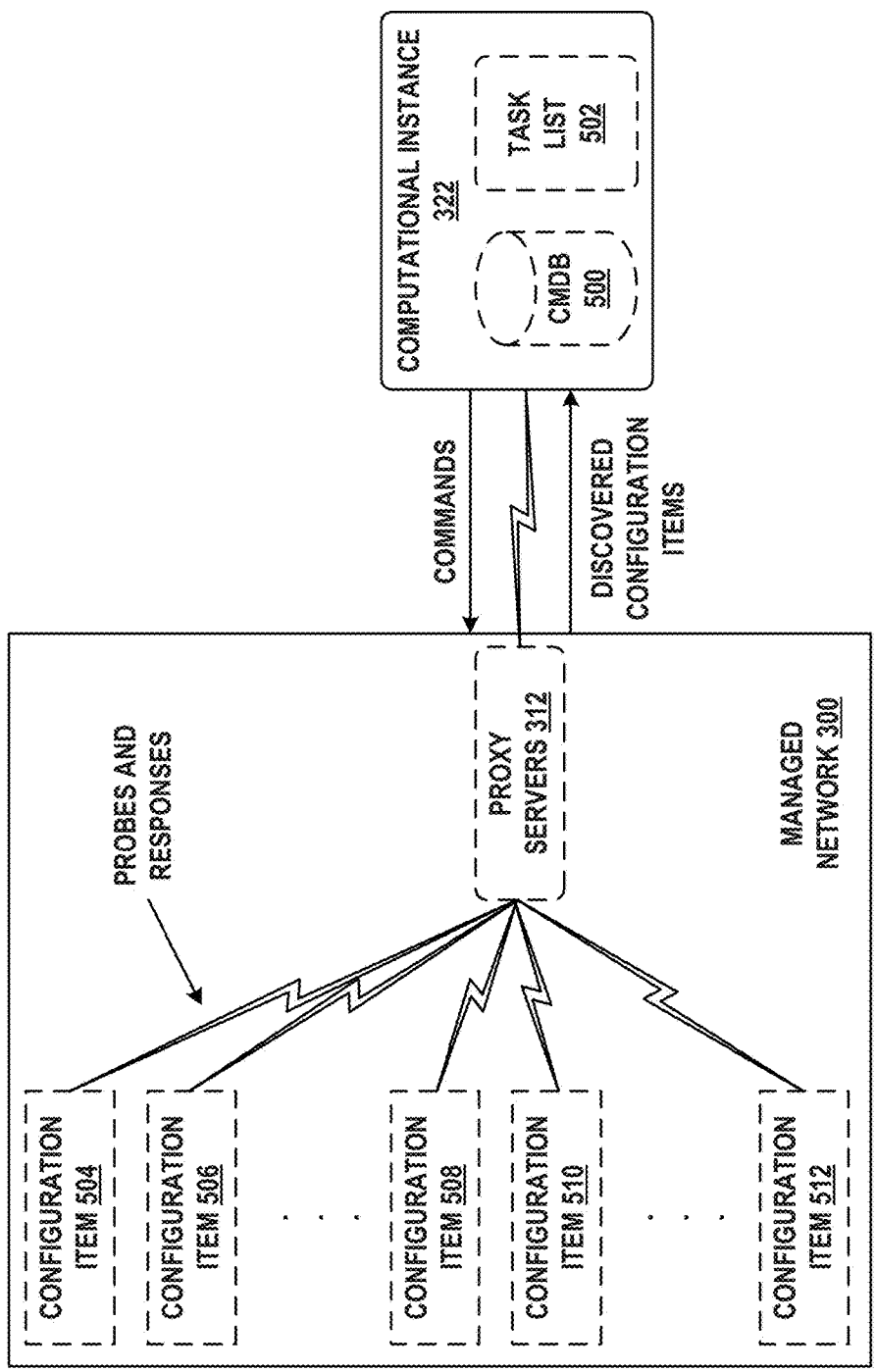
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
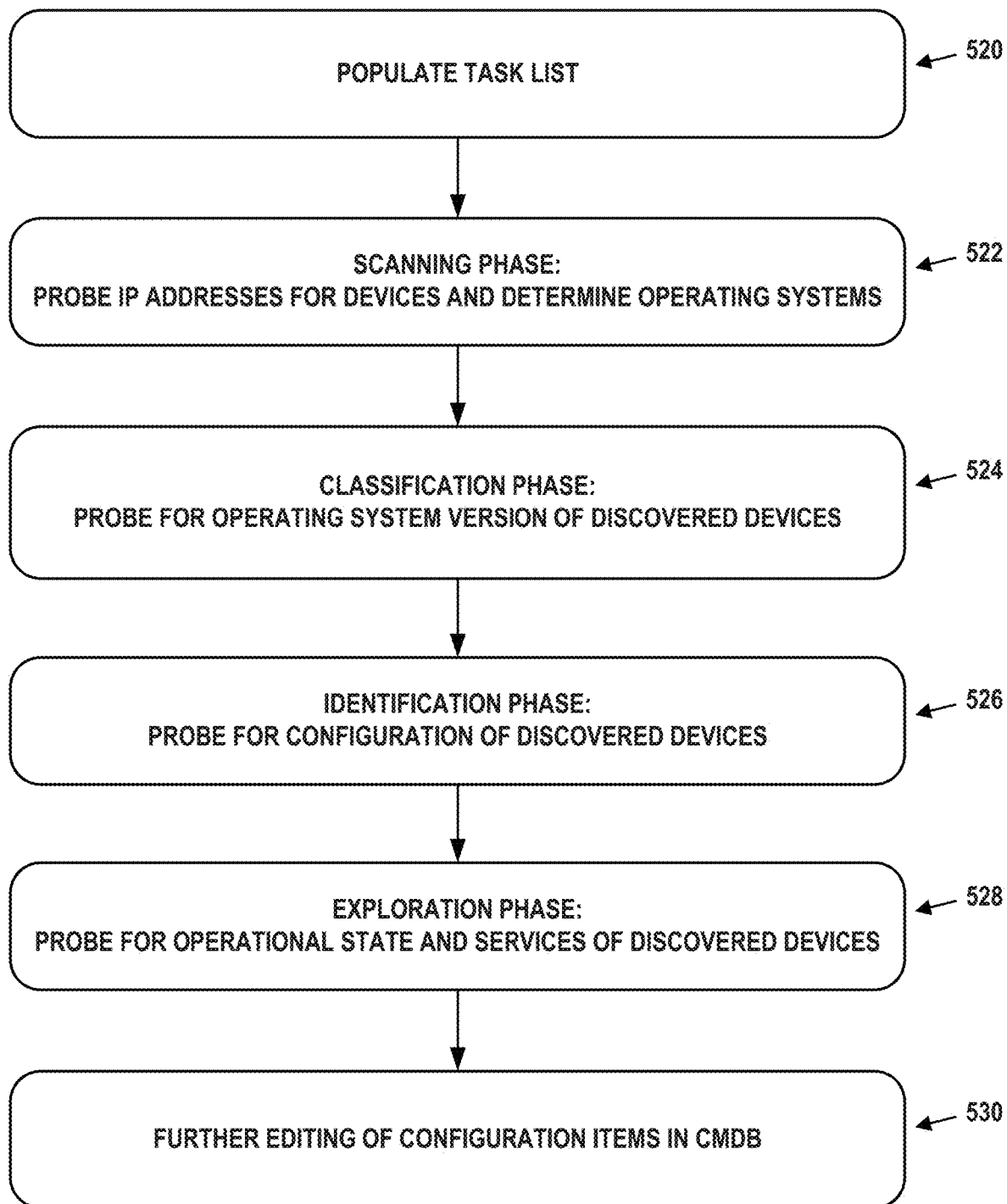
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE DATA MODEL AND DESCRIPTOR ARCHITECTURE

An enterprise or organization may typically create, use, store, and manage various types of data and information. Such data and information may support various aspects of operations and/or be produced as part of various aspects of operations. Non-limiting examples may include user/customer data, account information, employee data, sales data, inventory data, and financial transaction data, to name a few. Data and information may be stored in one or more databases, and be accessed by one or more application programs, operations, or services, among other procedures and/or functional entities of an enterprise and/or its supporting network management. Thus, such data and information may be considered "data resources" of an enterprise, and even viewed as "data assets" or "information assets" of the enterprise or organization of or its supporting network management.

In accordance with example embodiments, data resources may be managed as one or more configuration items of the enterprise or it supporting network management. For purposed of the discussion herein, configuration items, or CIs, will be considered in the context of network management, underlying infrastructure, architecture, and methods, as described above. That is, configuration items corresponding to data resources, data assets, information resources, and information assets will primarily be referred to as CIs of a managed network. It should be understood, however, that they can alternatively or additionally be considered CIs of an organization or enterprise that is supported by a managed network.

As described in connection with FIG. 5A, for example, CIs may include physical components and infrastructure, such as computing devices, application servers, database servers, and network routers and switches, among others. CIs may also include virtual components, such as virtual machines and computational resources. Still further, CIs may include logical components, such as application programs and services. In this context, data resources may be considered a category of logical configuration items of a managed network.

As also described above, a CMDB 500 may include information relating to CIs of a managed network. More specifically, the CMDB may include CI records, where each record corresponds to a respective CI of the managed network. For example, a particular network router may be a CI, and the CMDB may therefore include a particular CI record corresponding to the particular network router. A similar arrangement applies to other CIs of the managed network. In strict terms, a given CI record of the CMDB corresponds to a given CI of the managed network. However, for convenience in the discussion herein, the CMDB will sometimes be referred to as containing a CI, as a sort of shorthand for containing a specific CI record corresponding to a specific CI.

In accordance with example embodiments, a data resource may be represented as CI by a logical data structure referred to herein as an "Information Object" CI or "IO CI." More particularly, an IO CI may be implemented as table record arranged to store or maintain information that associates, links, or conceptually connects a data resource with one or more application programs that use data resource, as well as identifies one or more infrastructure elements or components (e.g., computing devices and/or servers) on which the one or more application programs run. An IO CI may further include information that associates a data resource with a "resource database" that makes the data resource available in the context of database operations. Additional information of an IO CI may also identify one or more database instances that implement the resource database, as well as one or more database servers on which the one or more database instances are installed and made operational.

Also in accordance with example embodiments, an IO CI may be represented as a CI record in the CMDB, as a sub-record, sub-table, or other form of extension, of a CI record in the CMDB. That is, a data resource may be considered a CI, just as a computing device or application program may be a CI, for example. In the CMDB, a data resource CI may thus be represented by a CI record that is, or is associated with, an IO CI. Among the benefits and advantages of an IO CI is that it provides for, and supports, mapping and managing of interrelationships between application programs that use the associated data resource, resource databases that maintain the data resource, and infrastructure elements and/or components that provide implementation support for the application programs and the resource databases.

Within an enterprise (and/or a managed network that supports it), there may be multiple data resources. Some may be separate and unrelated structurally or functionally; others may be related operationally, or by association or reference; and still others may be related within a hierarchy. Other organizational arrangements are possible as well. In accordance with example embodiments, multiple, respective data resources may be represented by multiple, respective IO CIs in one or more tables or databases, for example.

Also in accordance with example embodiments, an organizational and/or hierarchical relationships between multiple IO CIs may be captured or represented according to an organization framework referred to herein as a "data domain." More particularly, a data domain may form a sort of metadata that describes how multiple IO CIs are categorized, organized, and/or related. For example, an enterprise may maintain multiple forms and aspects of employee data, such as personal information, job description, salary, etc. Each of these forms of data may be considered a respective data resource, each used by one or more of the same or different application programs. But all of them might be part of a common hierarchy deriving from a top-level of, for example, human resources (HR) data. Other relationships among these data resources may be possible as well. One or more data domains may capture or codify the relationships.

Periodically or from time to time, there can be circumstances, operations, and/or procedures within an enterprise that may require identification of all or a subset of particular data resources that meet some criteria, or that fall within one or more particular categories. The requirement may further extend to identification of all or some of the application programs that use the particular data resources, all or some of the resource databases that maintain the particular data resources, and all or some of the infrastructure elements or components that support the applications and resource databases. An example of such circumstance or operation may be an audit, which may need to be carried out for regulatory compliance reasons, or to fulfill some other operational need. The identification of the appropriate data resources, applications, databases, and infrastructure may be considered as defining or specifying the scope of the audit.

In accordance with example embodiments, systems and methods for implementing and using information objects, including IO CIs and data domains, may be used for mapping and managing interrelationships between data resources, application programs that utilize the data resources, and infrastructure components of a managed network associated with a computational instance of a remote network management platform. In the following discussion, the terms "application instance" and "database instance" are introduced in the context configuration items and/or management thereof. It should be understood that the term "instance" used in this context is distinct from the same term used in reference to a "computational instance" or a "customer instance." That is, a "computational instance" (or "customer instance") refers to particular architectural features or components of a remote network management platform, such as the one illustrated, for example, in FIGS. 3 and 4. In contrast, the terms "application instance" or "database instance," refer to particular or specific "instantiations" of an application or database.

Figure 6:
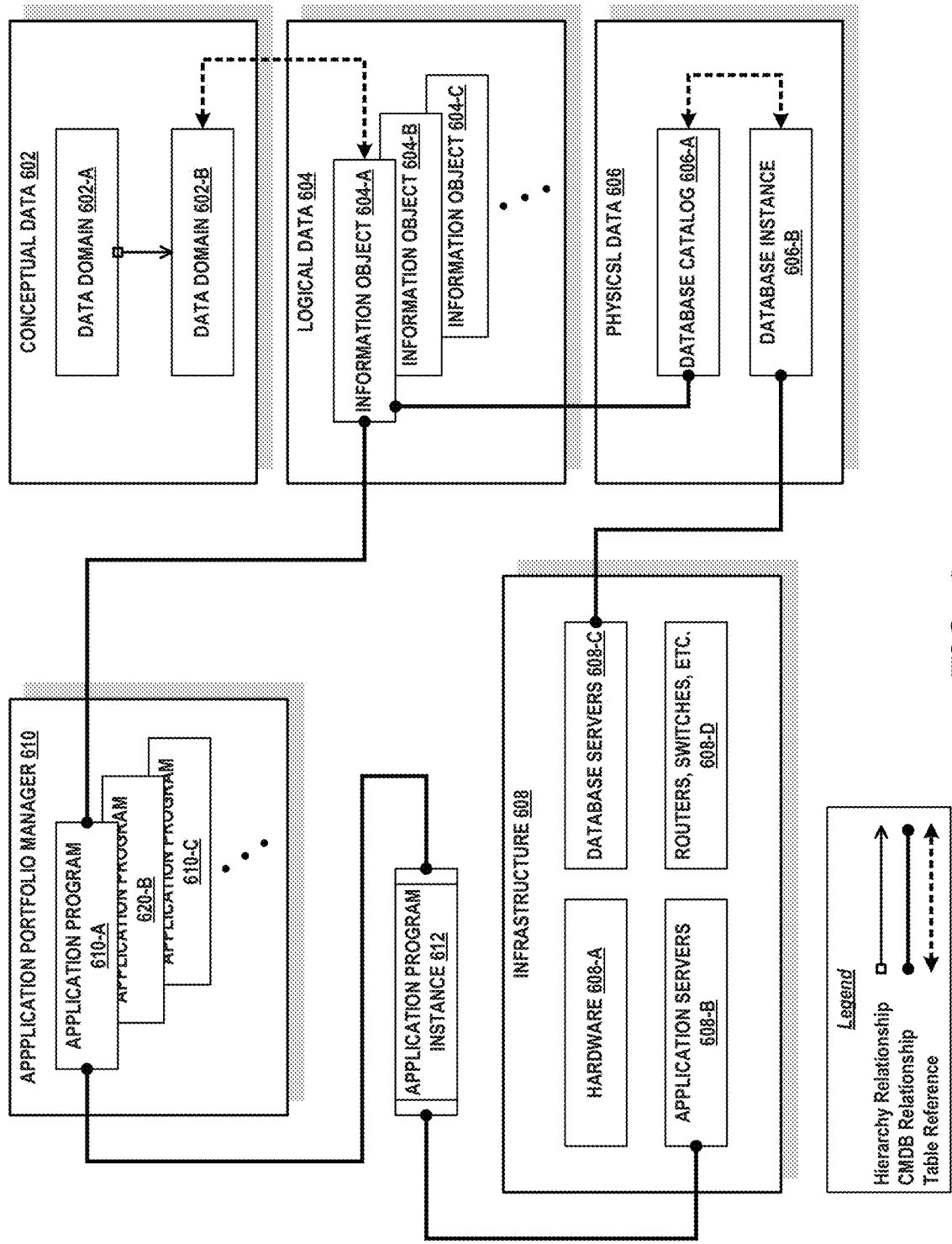
FIG. 6 illustrates a schematic drawing of a data model for a descriptor architecture, in accordance with example embodiments.

FIG. 6 illustrates a schematic drawing of a data model for an example descriptor architecture, in accordance with example embodiments. The example architecture is made up of various architectural elements, each containing one or more components, with various interconnections between the components within or across elements. As described below, some of the elements and components may be logical, such data or data structures. Others may be physical, such as infrastructure. In the example architecture, five primary architectural elements are shown: conceptual data 602, logical data 604, physical data 606, infrastructure 608, and an application portfolio manager (APM) 610. Each of these is discussed below in more detail.

Various components of the architectural elements are "connected" according to functional relationships between the components, the data or information that may be transferred between them, and/or logical or conceptual associations between them. As such connections may correspond to physical connections, such as physical communicative connections, and/or logical connections, such as programmatic transfer between application programs.

The connection between any two components may be one of three types, as indicated in a legend in the figure: hierarchy relationship, CMDB relationship, or table reference. More particularly, a hierarchy relationship indicates a parent-child relationship, where an arrow points from parent to child. A CMDB relationship indicates a relationship defined according to a pairing-relation table that is associated with, or is a sub-table of, the CMDB. Specifically, each entry or record of the pairing-relation table identifies a pair of CI records of the CMDB that correspond to a pair of CIs that are related in some way that is described in the record. The description of the relationship may include a type and one or more attributes. In an example embodiment, the pairing-relation table may be referred to a "CMDB relationship table." A table reference may be a link or pointer from an entry in one table to another table or an entry in another table. Note that a hierarchy relationship may be implemented by a table reference. These definitions of types apply as well to FIGS. 7A, 7B, and 8, discussed further below.

As shown the conceptual data 602 includes the data domain, exemplified by a hierarchy including parent data domain 602-A and child data domain 602-B. The hierarchy is indicated by the hierarchy relationship connection from parent to child. As described below, the child data domain could derive from a record field or table column of the parent data domain.

The logical data 604 includes, by way of example, information objects 604-A, 604-B, and 604-C. Also by way of example, IO 604-A is related to the data domain 602-B by a table reference, as indicated. For example, IO 604-A may include a pointer or link to a record filed or table column in data domain 602-B. As such, IO 604-A may be associated with a particular table or column within a hierarchy defined by the data domains in the conceptual data 602, for example.

In accordance with example embodiments, the APM 610 may be a hardware and/or software facility or module that organizes, maintains, and manages application programs of the enterprise. By way of example, the APM 610 includes application programs 610-A, 610-B, and 610-C. These could be business applications, for example, though other types or classes of application programs could be included. As show by way of example, the IO 604-A is related to application program 610-A by a CMDB relationship connection. This may indicate that application program 610-A uses the data resource associated with IO 604-A. As described above, this relationship may be specified by a record in a pairing-relation table in or associated with the CMDB. The record may also specify attributes of the relationship, such as permission settings for various operations that the application program 601-A may perform on the data resource associated with the IO 604-A.

An application program instance 612 is also shown in FIG. 6. As indicated by the CMDB relationship connecting the instance 612 to the application program 610-A, the instance 612 is an actual instantiation of the application program 610-A.

By way of further example, infrastructure 608 includes hardware 608-A, application servers 608-B, database servers 608-C, and routers/switches 608-D. A CMDB relationship connection between the instance 612 and application servers 608-B indicates that the instance 612 is actually implemented on the application servers 608-B.

The physical data 606 includes a database catalog 606-A and a database instance 606-B. In accordance with example embodiments, the database catalog may describe or specify particular data resources, such as employee data, salary data, or payroll data. The database instance may correspond to one or more actual instances of a resource database. As shown, the relationship or connection between database catalog 606-A and database instance 606-B is a table reference. This reference indicates that database catalog 606-A may actually be found on (or maintained by) database instance 606-B. A CMDB relationship connection between the database instance 606-B and database servers 608-C, again specified in the pairing-relation table, indicates the specific database server on which the database instance is implemented or deployed.

As also shown, the IO 604-A is connected with the database catalog 606-A by a CMDB relationship. That is, a record in the pairing-relation table specifies that the data resource associated with IO 604-A is part of a database specified by the database catalog 606-A, and thus may be stored or maintained on the database instance 606-B.

With the arrangement illustrated by way of example in FIG. 6, the IO 604-A may serve to connect or relate the data resource associated with the IO 604-A with (i) the application program 610-A that uses the data resource, (ii) the application instance 612 that implements the application program 610-A, (iii) the application servers 608-B on which the instance 612 is actually running, (iv) the database catalog 606-A that defines the data resource, the database instance 606-B that implements the catalog, and (v) the database servers 608-C on which the database instance is implemented. Thus, in accordance with example embodiments, the IO provides a unifying data repository for collecting information about all the relevant configuration items related to the data resource.

In accordance with example embodiments, and as described above in connection with FIGS. 3 and 4, the CIs of a managed network may be discovered, and the CMDB populated with CI records, using an automated discovery procedure. In further accordance with example embodiments, the discovery procedure may also determine the CMDB relationships between at least some of the pairs of CIs that are related. In particular, automated discovery may discover and record relationships between application programs, application instances, and hosting infrastructure. Automated discovery may also find this information for database catalogs, database instances, and database servers.

In the case of data resources, IOs, and IO CIs, discovery of the relevant information may sometime entail manual data entry. For example, application programs may initially be installed and/or configured by information technology (IT) personnel according to a customized architectural design. Such a design could specify, for example, relations between application programs and data resources. This information could be used for defining appropriate IO CIs, as well as the CMDB relationships, but may not necessarily be discoverable by an automated procedure. As such, this information may be entered manually when the application programs are installed or configured, for example. A similar manual procedure could be used for configuring database catalogs associated with the data resources.

In accordance with example embodiments, the type of CMDB relationship between an IO CI and an application program could specify that the associated data resource is "used by" the application program, and that the application program "uses" the associated data resource. Similarly, the type of CMDB relationship between an IO CI and database catalog could specify that the associated data resource is "depends on" the database catalog, and that the database catalog "uses" the associated data resource. Other types of CMDB relationships may be possible as well.

Also in accordance with example embodiments, the CMDB relationship between an IO CI and an application program could specify attributes. In particular, the attributes could correspond to permission settings for operations that the application program can perform on the associated data resource. Non-limiting examples of the permission attributes include creating, reading, updating, and deleting (CRUD).

Figure 7A:
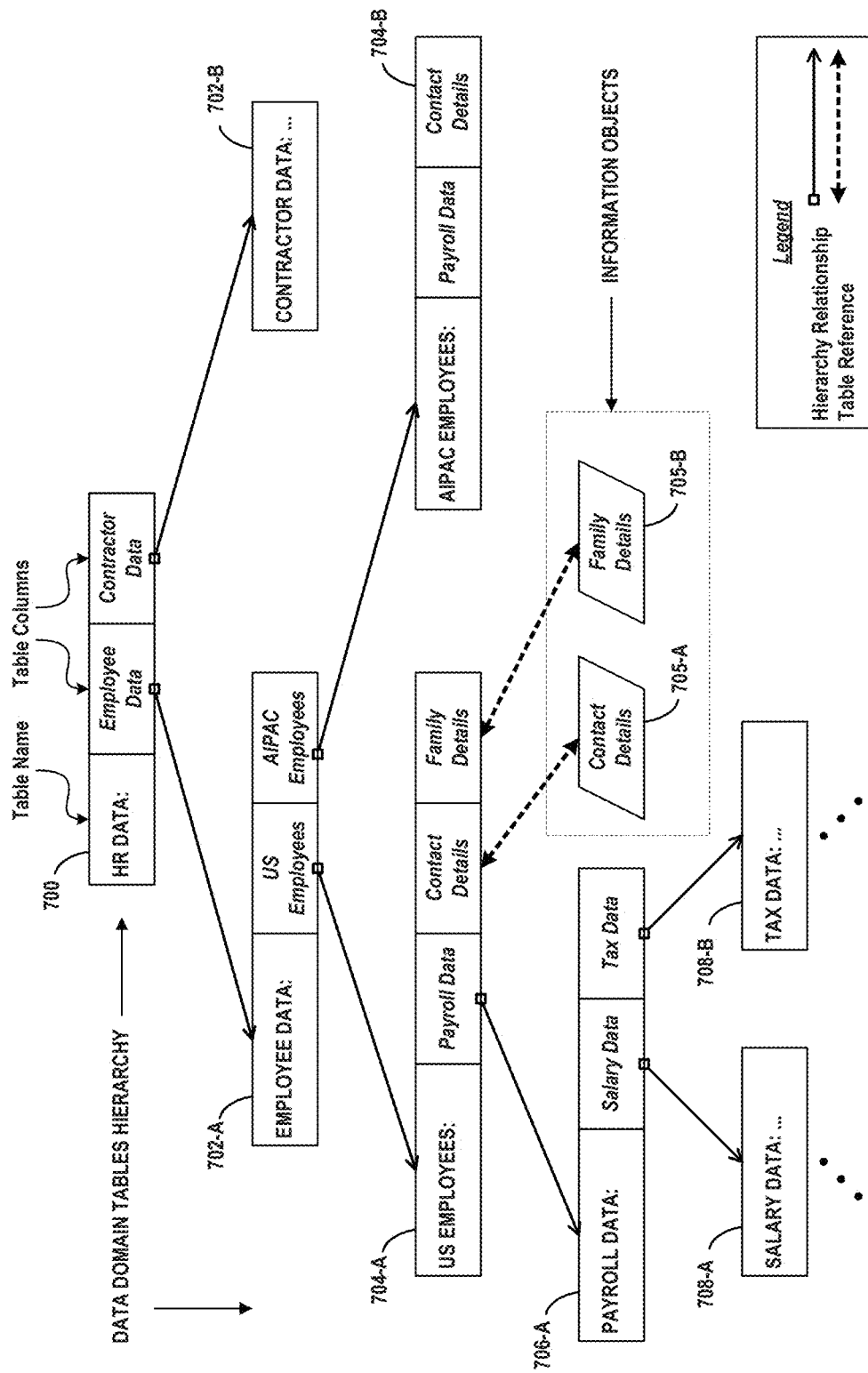
FIG. 7A illustrates a schematic drawing a data hierarchy, in accordance with example embodiments.

FIG. 7A shows an example data domain in further detail. In the illustration, a top-level, or "root" node of a data domain hierarchy is represented by a data domain table 700 for organizing a hierarchy of HR data. As shown, the HR table 700 includes, by way of example, two table columns: employee data and contractor data. Each of these columns is connected by a hierarchy relationship to a respective child table, namely an employee data domain table 702-A and a contractor data domain table 702-B. By way of example, the employee data table 702-A includes two columns: US employees, and AIPAC employees. Each of these columns, in turn, have hierarchy relationships to respective child tables 704-A (US employees) and 704-B (AIPAC employees).

Also by way of example, the US employees table 704-A has three columns: payroll data, contact details, and family details. Payroll data has a hierarchy relationship to a child table 706-A. However, contact details and family details each have a table reference to a respective information object. Namely, IO 705-A (contact details), and IO 705-B (family details). This illustrates how the data domain organizes a hierarchy of tables, and places particular IOs within the hierarchy. The IO CIs associated with the hierarchy may thus be considered a hierarchy of IO CIs, and correspond to specific data resources, as described above.

Continuing with the example of FIG. 7A, the payroll data table 706-A has two columns: salary data and tax data. Each of these has a hierarchy relationship with a respective child table. Namely, salary data 708-A and tax data 708-B. It will be appreciated the illustration of FIG. 7A is just one example of a form of data domain hierarchy.

Figure 7B:
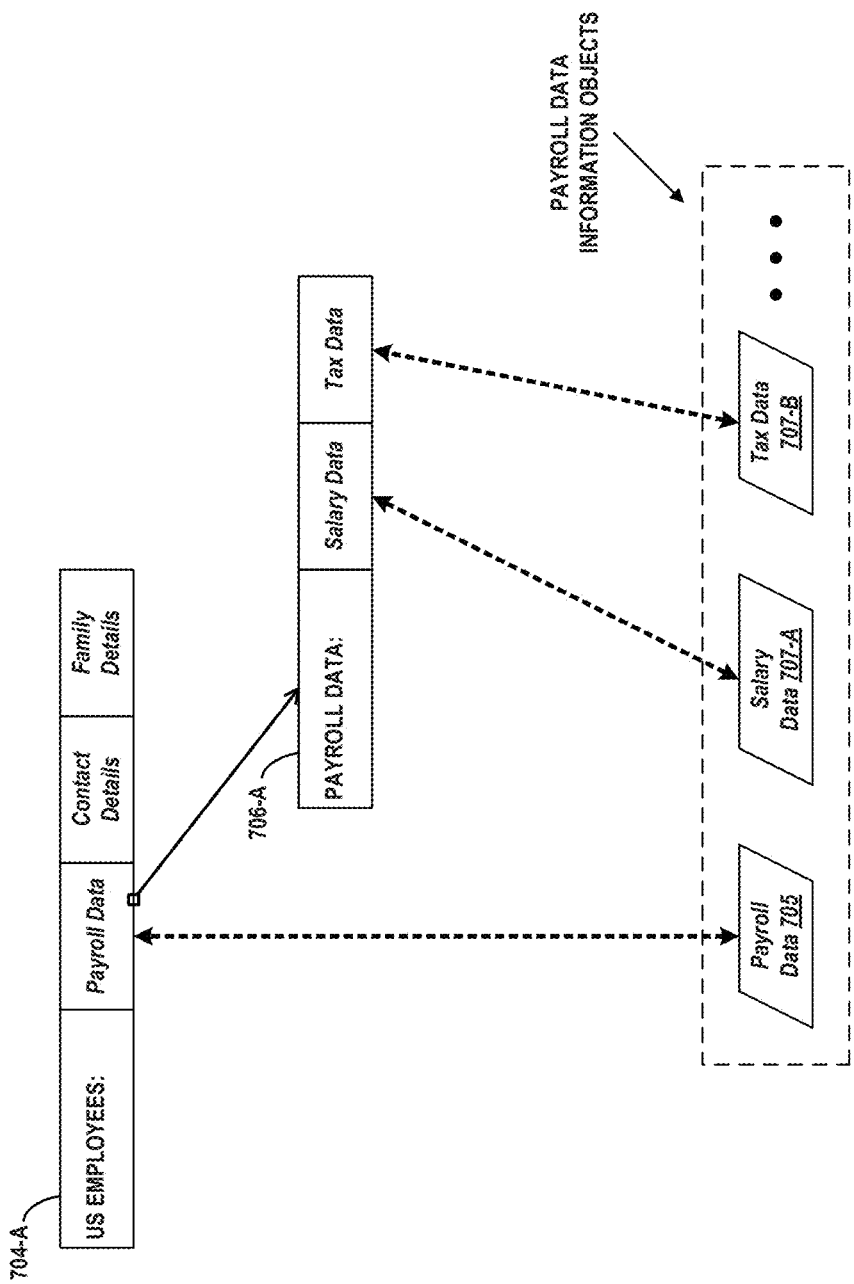
FIG. 7B illustrates a schematic drawing a selected portion of a data hierarchy, in accordance with example embodiments.

FIG. 7B illustrates how the data domain may be used to identify IO CIs associated with payroll data. As shown by way of example, payroll data is a column in the data domain table 704-A for US employees. The payroll data column has a table reference to an IO 705 corresponding to payroll data, and also has a hierarchy relationship to a data domain table 706-A. The table 706-A has two columns, salary data and tax data, each of which has a table reference to a respective IO, namely IO 707-A (salary data) and IO 707-B (tax data). Thus, in this illustrative example, the hierarchy under the table 704-A is associated with three payroll IOs, and thus three data resources.

In accordance with example embodiments, the data domain may be a starting point for identifying data resources associated with a particular hierarchy. The top or root of the hierarchy may, for example, correspond or define the scope of an audit specified by a need to audit payroll data and all related applications, databases, and infrastructure.

Figure 8:
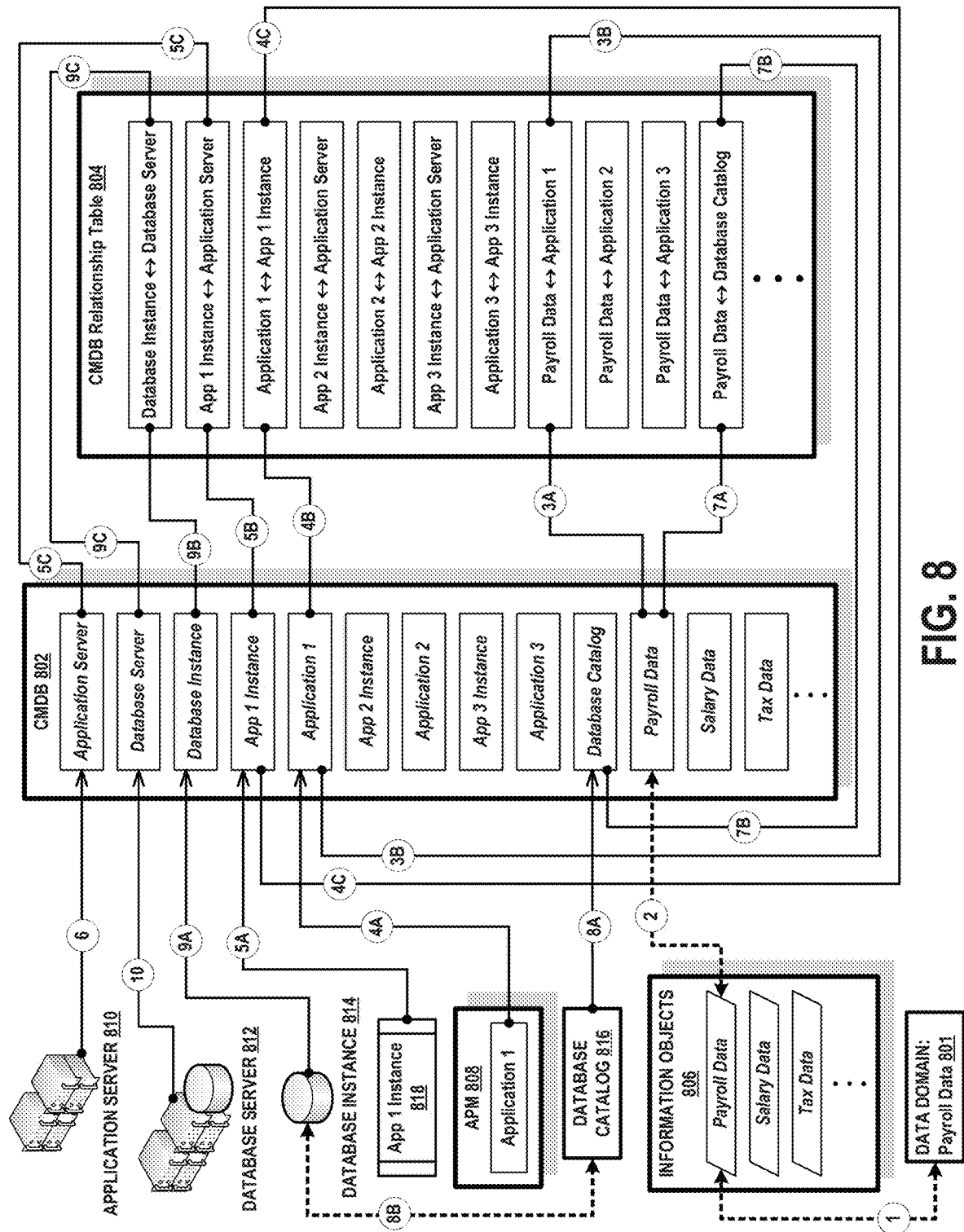
FIG. 8 is an illustrative mapping of information objects within a data model, in accordance with example embodiments.

FIG. 8 illustrates in further detail, and again by way of example, how the data domain and information objects may be used to discover the CIs within a specified scope of a data hierarchy. The system represented in FIG. 8 includes a CMDB 802, a CMDB relationship table 804, an IO table 806, an APM 808, an application server 810, a database server 812, a database instance 814, a database catalog 816, and application instance 818. The illustration also includes an example data domain 801 corresponding to the payroll data column of the data domain table 704-A shown in FIG. 7B. All of the entities IO table 806, APM 808, application server 810, database server 812, database instance 814, database catalog 816, and application instance 818 may be considered configuration items of a managed network. Each has a corresponding CI record in the CMDB 802, except for the IO table 806, for which each individual IO has IO CI in the CMDB 802.

The CMDB relationship table 804 includes CMDB relationship records defining pairs of CIs that are related. That is, each relationship record associates a pair of CI records in the CMDB 802. Each CI record, in turn, associates a CI with a relationship record. Each CI is also associated with a specific configuration item; a respective arrow pointing from each CI to a corresponding CI record indicates this association.

An example of determination or discovery of scope is indicated in FIG. 8 by circled numbers labeling various connections between CIs, CI records, and CMDB relationship records. Each connection is either a CMDB relationship or a table reference, as indicated. Label 1 shows a table reference from payroll data 801 to a corresponding IO in the IO table 806. The IO for payroll data has table reference, label 2, to a payroll data IO CI record in the CMDB 802. The payroll data IO CI record, in turn has two CMDB relationships to respective CMDB relationship records in the CMDB relationship table 804. Namely, label 3A shows the CMDB relationship to a relationship record associating the payroll IO CI record to "Application 1," and label 7A shows the CMDB relationship to a relationship record associating the payroll IO CI record to a CI record associated with the database catalog 816.

Following the Application 1 relationship, label 3B is a CMDB relationship to the CI record for Application 1 in the CMDB 802. As a visual cue for convenience in tracing the connection, the label 3B is shown twice. The CI record for Application 1 is associated, by the arrow label 4A, with Application 1 in the APM 806; this is the actual CI corresponding to Application 1. The CI record for Application 1 also has a CMDB relationship, label 4B, to a CMDB relationship record associating the CI record for Application 1 with a CI record for an instance, "App 1 Instance," of Application 1. This relationship record has a CMDB relationship, label 4C, to a CI record associated with the App 1 Instance 818 (label 4C is shown twice for convenience).

The CI record for App 1 Instance has a CMDB is associated, by the arrow label 5A, with the actual App 1 Instance 818, and also has a CMDB relationship, label 5B, to a CMDB relationship record associating the CI record for the App 1 Instance to the CI record for the application server. This represented by the CMDB relationship, label 5C, to the Application Server CI record, and the arrow label 6, from the Application Server CI 810 to the CI record for the Application Server 810.

Continuing now with the connections involving the database, the CMDB relationship record associating the payroll IO CI with the database catalog has a CMDB relationship, label 7B, with the CI record associated with the database catalog 816. An arrow, label 8A, indicates this association. The database catalog 816 has a table reference, label 8B, to the database instance 814, and the database instance 814 is associated with a CI record by an arrow, label 9A. The CI record for the database instance has a CMDB relationship, label 9B, with a CMDB relationship record associating the database instance with the database server. This CMDB relationship, in turn, has a CMDB relationship connection, label 9C, with the CI associated with the database server 812. This association is indicated by the arrow, label 10, from the database server 812 to the associate CI record.

The illustration of FIG. 8 provides a detailed example of how the descriptor architecture depicted schematically in FIG. 6 may support mapping and managing interconnections between CIs that are related by their use and/or management of data resources of a managed network. It should be understood that the illustrated example is not intended to be limiting with respect to operations involve determining or discovering scope. Further, there may be additional ways to apply the descriptor architecture for achieving other forms of determination and/or discovery of CIs that are related by way of data resources or other forms of data assets or information assets. Further examples are briefly outlined below.

In accordance with example embodiments, an information-object framework similar to the one described above may be used to provide and/or support systematic consistency of integration between applications. More particularly, an information-object framework may be fashioned to determine how applications of an enterprise are integrated with one another—that is, which applications are connect to each other, and how the interconnects affect the applications. This information may be used to assess the impact of changes to one or more applications, and/or to one or more data resources used by the applications.

In an example embodiment, CMDB relationship attributes may be used to specify type of integrations. Non-limiting examples may include transport types, such as HTTP, JSON, and ETL. Attributes may also specify integration modes, such as automated or manual, or may specify characteristics such as frequency, upstream, downstream, and so on. Relationships between IOs and applications may again be captured in CMDB relationships, which may also store API dependencies between applications. Dependencies can be registered for change management. This information could then be made available to IT and other technology personnel charged with changing or updating applications and/or data resources.

Also in accordance with example embodiments, an information-object framework similar to the one described above may be used to provide and/or support systematic determination of information lineage. It can happen that multiple applications store the same type of data, such as employee contact details for example. This can sometimes lead to data duplication with different, possibly inconsistent versions of what should otherwise be identical information. An information-object framework may be used to identify a "data origin" of a particular data set or data item. In an example embodiment, IOs may be used to track data flows between applications, including how the data are modified. This, in turn, allows the original data to be determined, and consistency restored across all applications and databases that use and maintain the associated data resources.

As yet another example, an information-object framework similar to the one described above may be used to provide and/or support systematic response to vulnerabilities. Specifically, CIs that are impacted by a known or discovered vulnerability may be identified using IO CIs to tie together classes and/or categories of applications, data resources, and databases that may be subject to a vulnerability. In an example embodiment, the National Institute of Standards (NIST) may provide a vulnerability database from which impacted CI types may be determined. Then, a framework similar to the one described above in connection with audit scope may be used to identify the scope one or more vulnerabilities. Appropriate protective actions or strategies may then be developed and/or deployed.

It will be appreciated that an information-object framework developed according to a descriptor architecture may be used to solve other problems encountered in network management.

VI. EXAMPLE METHODS

Figure 9:
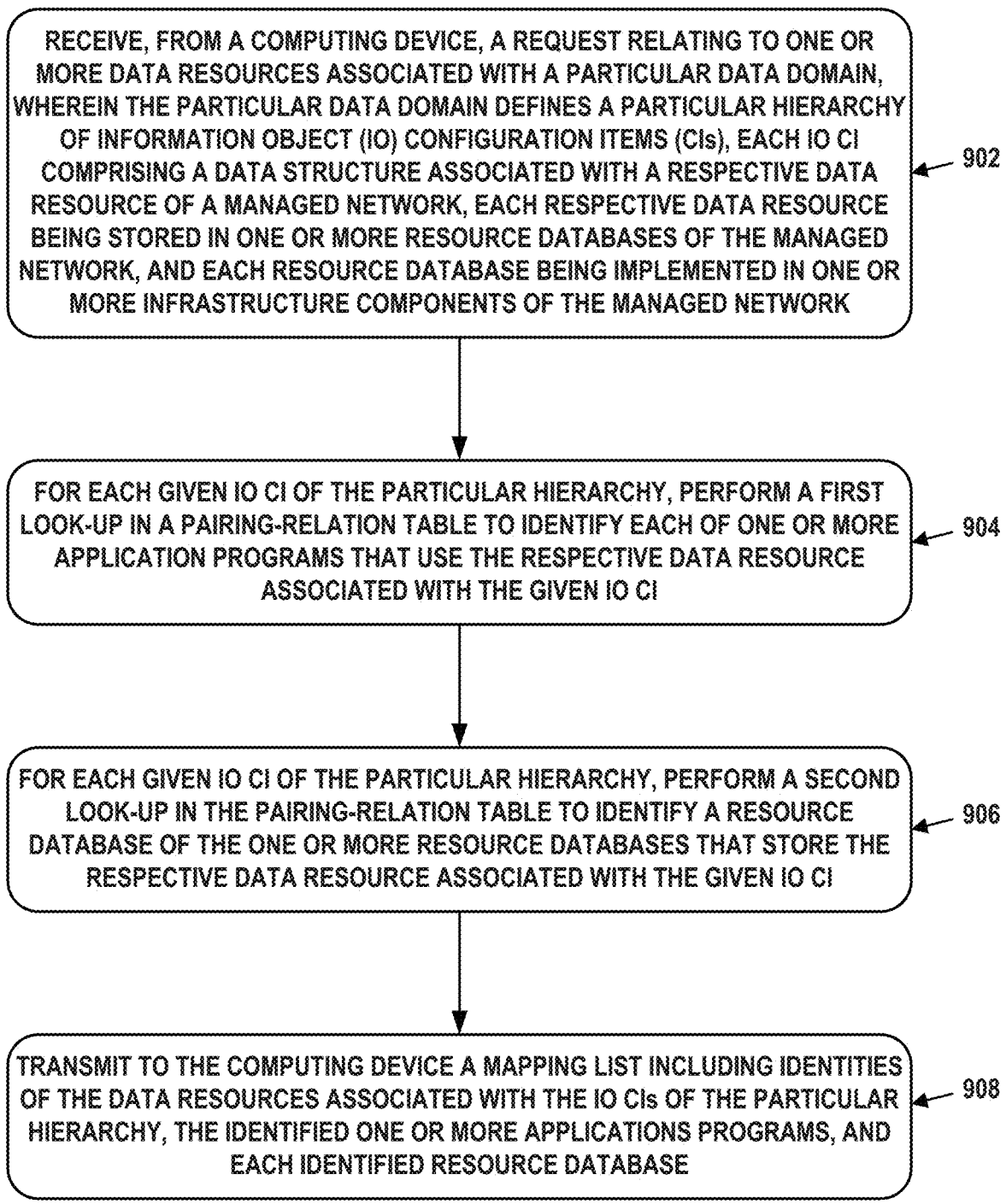
FIG. 9 is a flow chart, in accordance with example embodiments.

FIG. 9 is a flow chart illustrating an example embodiment of a method 900. The method illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. In an example embodiment, the method illustrated in FIG. 9 may be carried out by a computing device disposed within a computational instance, such as instance 322, of a remote network management platform, such as platform 320, which remotely manages a managed network, such as network 300.

The embodiments of FIG. 9 may be simplified by the removal of any one or more of the features shown therein. Further, these embodiments may be combined with features, aspects, and/or implementations of any of the previous figures or otherwise described herein.

The method 900 may be carried out in a system for mapping and managing interrelationships between data resources, application programs that utilize the data resources, and infrastructure components of a managed network associated with a computational instance of a remote network management platform. The system may include a configuration management data database (CMDB) disposed within the computational instance and configured for storing configuration item (CI) records associated with CIs of the managed network, wherein each CI corresponds to one of a class of entities that are configurable within the managed network, the class of entities including infrastructure components, application programs, and the data resources. The system may also include one or more server devices disposed within the computational instance and configured to carry out various operations of the example method.

Non-limiting examples of infrastructure components may include, devices, server devices, database servers, computing systems, network devices, network routers, and network switches. Non-limiting examples of data resources may include data stored in at least one resource database of the managed network or at least one table thereof.

The example method 900 may also be embodied as instructions executable by one or more processors of the one or more server devices of the system. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the example method.

Block 902 of example method 900 may involve receiving a request from a computing device relating to one or more data resources associated with a particular data domain. The particular data domain may define a particular hierarchy of information object (IO) CIs, where each IO CI may be or include a data structure associated with a respective data resource of the managed network. Each respective data resource may be stored in one or more resource databases of the managed network, and each resource database may be implemented in one or more infrastructure components. Referring again to FIG. 7B as an illustrative example, the data domain could be associated with payroll data 706-A, for example.

Block 904 may involve performing a first look-up for each given IO CI of the particular hierarchy in a pairing-relation table to identify each of one or more application programs that use the respective data resource associated with the given IO CI.

Block 906 may involve performing a second look-up for each given IO CI of the particular hierarchy in the pairing-relation table to identify a resource database of the one or more resource databases that store the respective data resource associated with the given IO CI.

Finally, block 908 may involve transmitting to the computing device a mapping list including identities of the data resources associated with the IO CIs of the particular hierarchy, the identified one or more applications programs, and each identified resource database.

In accordance with example embodiments, each CI record of the CMDB may include configuration information associated with one entity of the class. In particular, each CI record associated with a given IO CI includes data-resource configuration information for a data resource associated with the given IO CI. Also in accordance with example embodiments, each IO CI may be implemented in an IO table of information objects, and the IO table may be a sub-table of the CMDB. In addition, the pairing-relation table may also be a sub-table of the CMDB.

In accordance with example embodiments, the pairing-relation table may include one or more CMDB relationship records, where each CMDB relationship record includes pairing information descriptive of a relationship between two different CIs of the managed network. In particular, the pairing information may include an association between the CI records of the two different CIs, including attributes of the relationship between two different CIs of the managed network.

In further accordance with example embodiments, one of the two different CIs may be a particular IO CI, the other one of the two different CIs may correspond to a particular application program. In this case, the attributes include permission settings for data operations performed by the particular application program on a particular data resource associated with the particular IO CI, where the data operations are one or more of creating, reading, updating, or deleting. Further, the pairing information may specify that (i) a particular data resource associated with the particular IO CI is used by the particular application program, and (ii) the particular application program uses the particular data resource.

In particular, performing the first look-up in the pairing-relation table may then entail determining, from the pairing-relation table, the attributes of the respective relationship between the given IO CI and each of the identified one or more application programs that use the respective data resource associated with the given IO CI. Specifically, determining the permission settings for data operations performed by any given one of the identified one or more application programs on the respective data resource associated with the given IO CI. The first look-up may further entail determining, from the pairing-relation table, the respective relationship type between the given IO CI and each given application of the identified one or more application programs that use the respective data resource associated with the given IO CI. Specifically, determining that each respective relationship type specifies that (i) the respective data resource associated with the given IO CI is used by the given application program, and (ii) the given application program uses the respective data resource associated with the given IO CI.

In further accordance with example embodiments, one of the two different CIs may be a particular IO CI, and the other one of the two different CIs may correspond to a particular resource database. In this case, the pairing information may specify that (i) a particular data resource associated with the particular IO CI depends on the particular resource database, and (ii) the particular resource database uses the particular data resource.

In particular, performing the second look-up in the pairing-relation table may then entail determining, from the pairing-relation table, a respective relationship type between the given IO CI and each given resource database of the identified resource databases. Specifically, determining that each respective relationship type specifies that (i) the respective data resource associated with the given IO CI depends on the given resource database, and (ii) the given resource database uses the respective data resource associated with the given IO CI.

In accordance with example embodiments, the mapping list may further include infrastructure information. Non-limiting examples of the infrastructure information may include one or more of: (i) identities of one or more computing devices on which the one or more identified application programs run, or (ii) identities of one or more database servers on which the at least one of each identified resource database is implemented. In this case, transmitting the mapping list may entail further including such infrastructure information in the transmitted mapping list.

In an example embodiment, the particular data domain may correspond to particular data resources within a scope of an audit of the managed network. As such, receiving the request may entail receiving a request for CIs within the scope of the audit, and transmitting the mapping list may entail transmitting a compilation of the CIs within the scope of the audit.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for mapping and managing interrelationships between data resources, application programs that utilize the data resources, and infrastructure components of a managed network associated with a computational instance of a remote network management platform, the system comprising:
    a configuration management data database (CMDB) disposed within the computational instance and configured for storing configuration item (CI) records associated with CIs of the managed network, wherein each CI corresponds to one of a class of entities that are configurable within the managed network, the class of entities including infrastructure components, application programs, and the data resources; and
    one or more server devices disposed within the computational instance, wherein the one or more server devices are configured to:
        receive, from a computing device, a request relating to one or more of the data resources associated with a particular data domain, wherein the particular data domain defines a particular hierarchy of information object (IO) CIs, each IO CI being a data structure associated with a respective data resource of the managed network, each respective data resource being stored in one or more resource databases of the managed network, and each resource database being implemented in one or more infrastructure components;
        for each given IO CI of the particular hierarchy, perform a first look-up in a pairing-relation table to identify each of one or more application programs that use the respective data resource associated with the given IO CI;
        for each given IO CI of the particular hierarchy, perform a second look-up in the pairing-relation table to identify a resource database of the one or more resource databases that store the respective data resource associated with the given IO CI; and
        transmit to the computing device a mapping list including identities of the data resources associated with the IO CIs of the particular hierarchy, the identified one or more applications programs, and each identified resource database.

2. The system of claim 1, wherein the infrastructure components include computing devices, server devices, database servers, computing systems, network devices, network routers, and network switches,
    and wherein the data resources include data stored in at least one resource database of the managed network or at least one table thereof.

3. The system of claim 1, wherein each CI record of the CMDB includes configuration information associated with one entity of the class.

4. The system of claim 3, wherein each CI record associated with a given IO CI includes data-resource configuration information for a data resource associated with the given IO CI.

5. The system of claim 1, wherein the pairing-relation table comprises one or more CMDB relationship records, each CMDB relationship record including pairing information descriptive of a relationship between two different CIs of the managed network.

6. The system of claim 5, wherein the pairing information comprises an association between the CI records of the two different CIs.

7. The system of claim 5, wherein one of the two different CIs is a particular IO CI,
    and wherein the pairing information includes attributes of the relationship between two different CIs of the managed network.

8. The system of claim 7, wherein the other one of the two different CIs corresponds to a particular application program,
    wherein the attributes include permission settings for data operations performed by the particular application program on a particular data resource associated with the particular IO CI, the data operations being at least one of creating, reading, updating, or deleting,
    and wherein the pairing information specifies that (i) a particular data resource associated with the particular IO CI is used by the particular application program, and (ii) the particular application program uses the particular data resource.

9. The system of claim 5, wherein one of the two different CIs is a particular IO CI, and the other one of the two different CIs corresponds to a particular resource database,
    and wherein the pairing information specifies that (i) a particular data resource associated with the particular IO CI depends on the particular resource database, and (ii) the particular resource database uses the particular data resource.

10. The system of claim 1, wherein the mapping list further includes infrastructure information, the infrastructure information being at least one of: (i) identities of one or more computing devices on which the one or more identified application programs run, or (ii) identities of one or more database servers on which the at least one of each identified resource database is implemented.

11. The system of claim 1, wherein each IO CI is implemented in an IO table of information objects, and wherein the IO table is a sub-table of the CMDB.

12. The system of claim 1, wherein the pairing-relation table is a sub-table of the CMDB.

13. A method for mapping and managing interrelationships between data resources, application programs that utilize the data resources, and infrastructure components of a managed network associated with a computational instance of a remote network management platform, the computational instance comprising a configuration management data database (CMDB) configured for storing configuration item (CI) records associated with CIs of the managed network, wherein each CI corresponds to one of a class of entities that are configurable within the managed network, the class of entities including infrastructure components, application programs, and the data resources, and wherein the method is carried out by one or more servers of the computational instance and comprises:

receiving, from a computing device, a request relating to one or more data resources associated with a particular data domain, wherein the particular data domain defines a particular hierarchy of information object (IO) CIs, each IO CI comprising a data structure associated with a respective data resource of the managed network, each respective data resource being stored in one or more resource databases of the managed network, and each resource database being implemented in one or more infrastructure components;

for each given IO CI of the particular hierarchy, performing a first look-up in a pairing-relation table to identify each of one or more application programs that use the respective data resource associated with the given IO CI;

for each given IO CI of the particular hierarchy, performing a second look-up in the pairing-relation table to identify a resource database of the one or more resource databases that store the respective data resource associated with the given IO CI; and transmitting to the computing device a mapping list including identities of the data resources associated with the IO CIs of the particular hierarchy, the identified one or more applications programs, and each identified resource database.

14. The method of claim 13, wherein the particular data domain corresponds to particular data resources within a scope of an audit of the managed network, wherein receiving the request comprises receiving a request for CIs within the scope of the audit, and wherein transmitting the mapping list comprises transmitting a compilation of the CIs within the scope of the audit.

15. The method of claim 13, wherein the pairing-relation table comprises one or more CMDB relationship records, each CMDB relationship record including pairing information descriptive of a relationship between two different CIs of the managed network, and wherein performing the first look-up in the pairing-relation table comprises determining, from the pairing-relation table, attributes of a respective relationship between the given IO CI and each of the identified one or more application programs that use the respective data resource associated with the given IO CI.

16. The method of claim 15, wherein the attributes include permission settings for data operations performed by any given one of the identified one or more application programs on the respective data resource associated with the given IO CI, the data operations being at least one of creating, reading, updating, or deleting.

17. The method of claim 15, wherein performing the first look-up in the pairing-relation table further comprises determining, from the pairing-relation table, a respective relationship type between the given IO CI and each given application of the identified one or more application programs that use the respective data resource associated with the given IO CI, each respective relationship type specifying that (i) the respective data resource associated with the given IO CI is used by the given application program, and (ii) the given application program uses the respective data resource associated with the given IO CI.

18. The method of claim 15, wherein performing the second look-up in the pairing-relation table comprises determining, from the pairing-relation table, a respective relationship type between the given IO CI and each given resource database of the identified resource databases, each respective relationship type specifying that (i) the respective data resource associated with the given IO CI depends on the given resource database, and (ii) the given resource database uses the respective data resource associated with the given IO CI.

19. The method of claim 13, wherein transmitting the mapping list comprising further including infrastructure information in the transmitted mapping list, the infrastructure information being at least one of: (i) identities of one or more computing devices on which the one or more identified application programs run, or (ii) identities of one or more database servers on which the at least one of each identified resource database is implemented.

20. A non-transitory computer readable medium having instructions stored thereon for mapping and managing interrelationships between data resources, application programs that utilize the data resources, and infrastructure components of a managed network associated with a computational instance of a remote network management platform, wherein the computational instance comprises (i) a configuration management data database (CMDB) configured for storing configuration item (CI) records associated with CIs of the managed network, wherein each CI corresponds to one of a class of entities that are configurable within the managed network, the class of entities including infrastructure components, application programs, and the data resources, and (ii) one or more servers, and wherein the instructions, when executed by one or more processors of the one or more servers, cause the one or more servers to carry out operations including:

receiving, from a computing device, a request relating to one or more data resources associated with a particular data domain, wherein the particular data domain defines a particular hierarchy of information object (IO) CIs, each IO CI comprising a data structure associated with a respective data resource of the managed network, each respective data resource being stored in one or more resource databases of the managed network, and each resource database being implemented in one or more infrastructure components;

for each given IO CI of the particular hierarchy, performing a first look-up in a pairing-relation table to identify each of one or more application programs that use the respective data resource associated with the given IO CI;

for each given IO CI of the particular hierarchy, performing a second look-up in the pairing-relation table to identify a resource database of the one or more resource databases that store the respective data resource associated with the given IO CI; and transmitting to the computing device a mapping list including identities of the data resources associated with the IO CIs of the particular hierarchy, the identified one or more applications programs, and each identified resource database.

\* \* \* \* \*